C. A. MILES.
TRANSMISSION GEARING.
APPLICATION FILED AUG. 25, 1914.
1,155,601.
Patented Oct. 5, 1915.
4 SHEETS—SHEET 1.
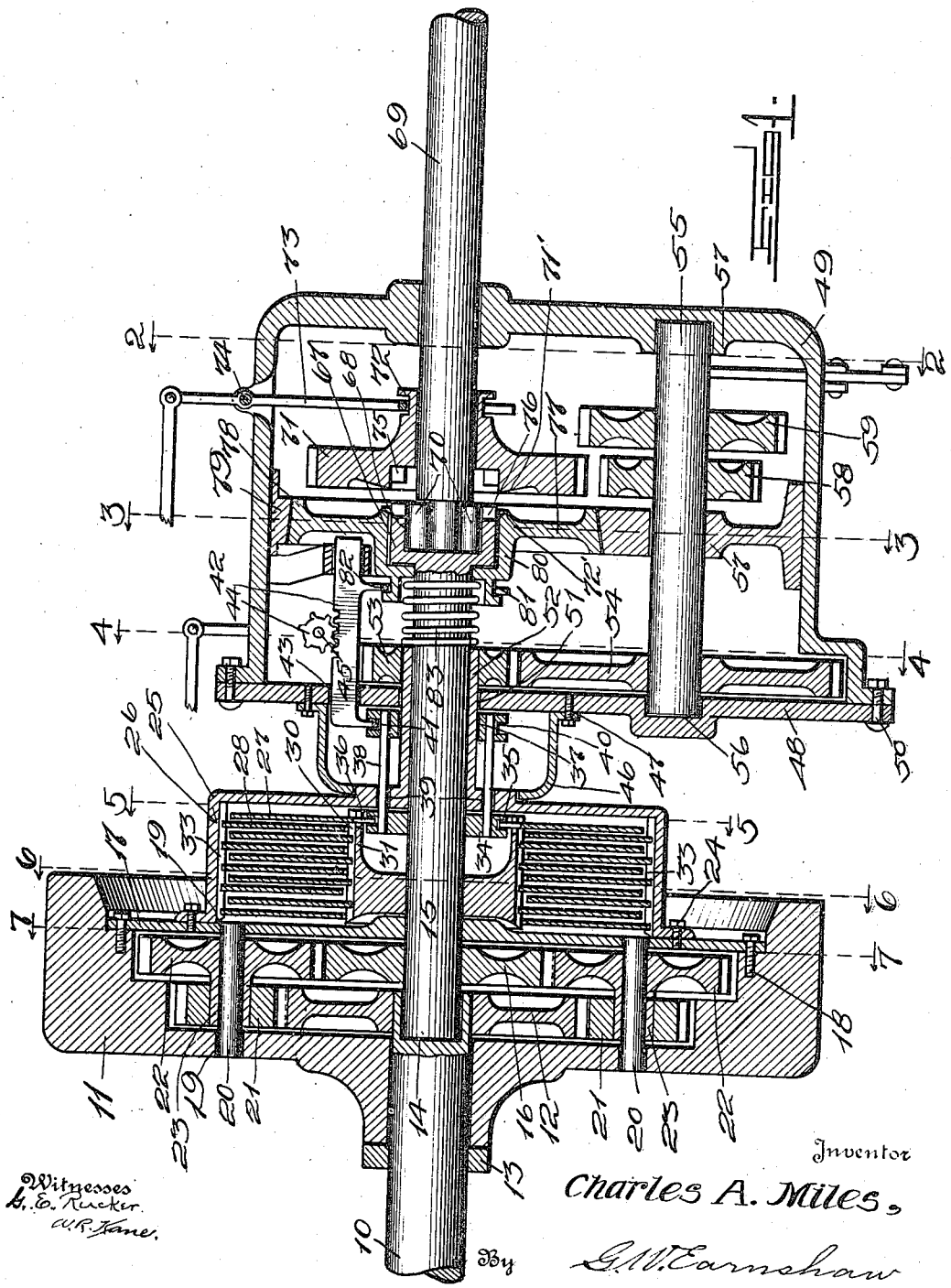
Witnesses
L. E. Rucker.
A. R. Kane.
Inventor
Charles A. Miles,
By G. W. Earnshaw
Attorney C. A. MILES.
TRANSMISSION GEARING.
APPLICATION FILED AUG. 25, 1914.
1,155,601.
Patented Oct. 5, 1915.
4 SHEETS—SHEET 2.
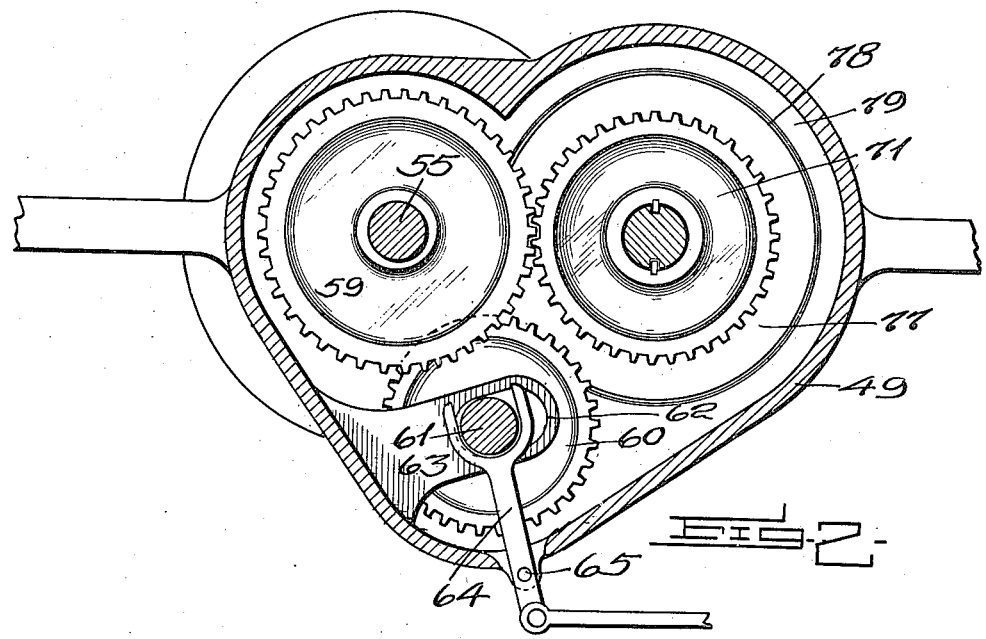
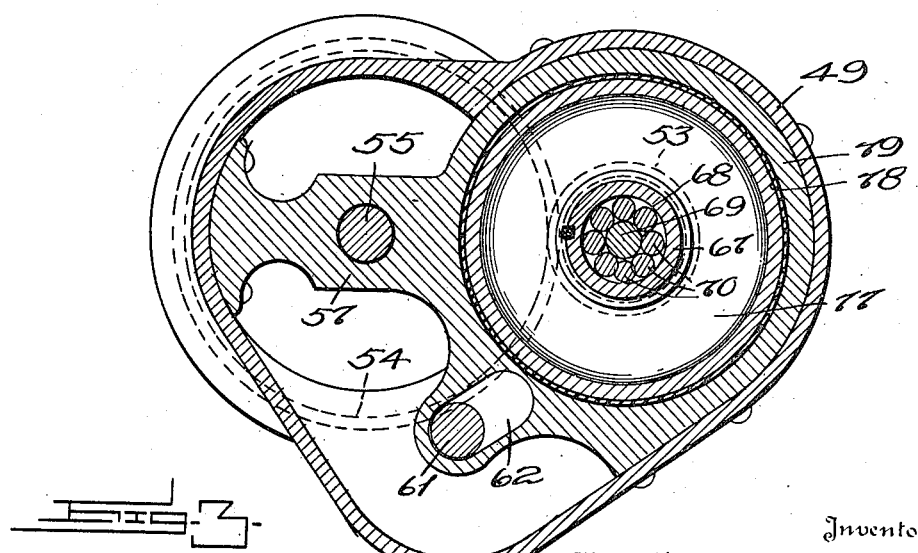
Witnesses
H. E. Rucker.
A. R. Kane.
Inventor
Charles H. Miles,
By G. W. Earnshaw
Attorney

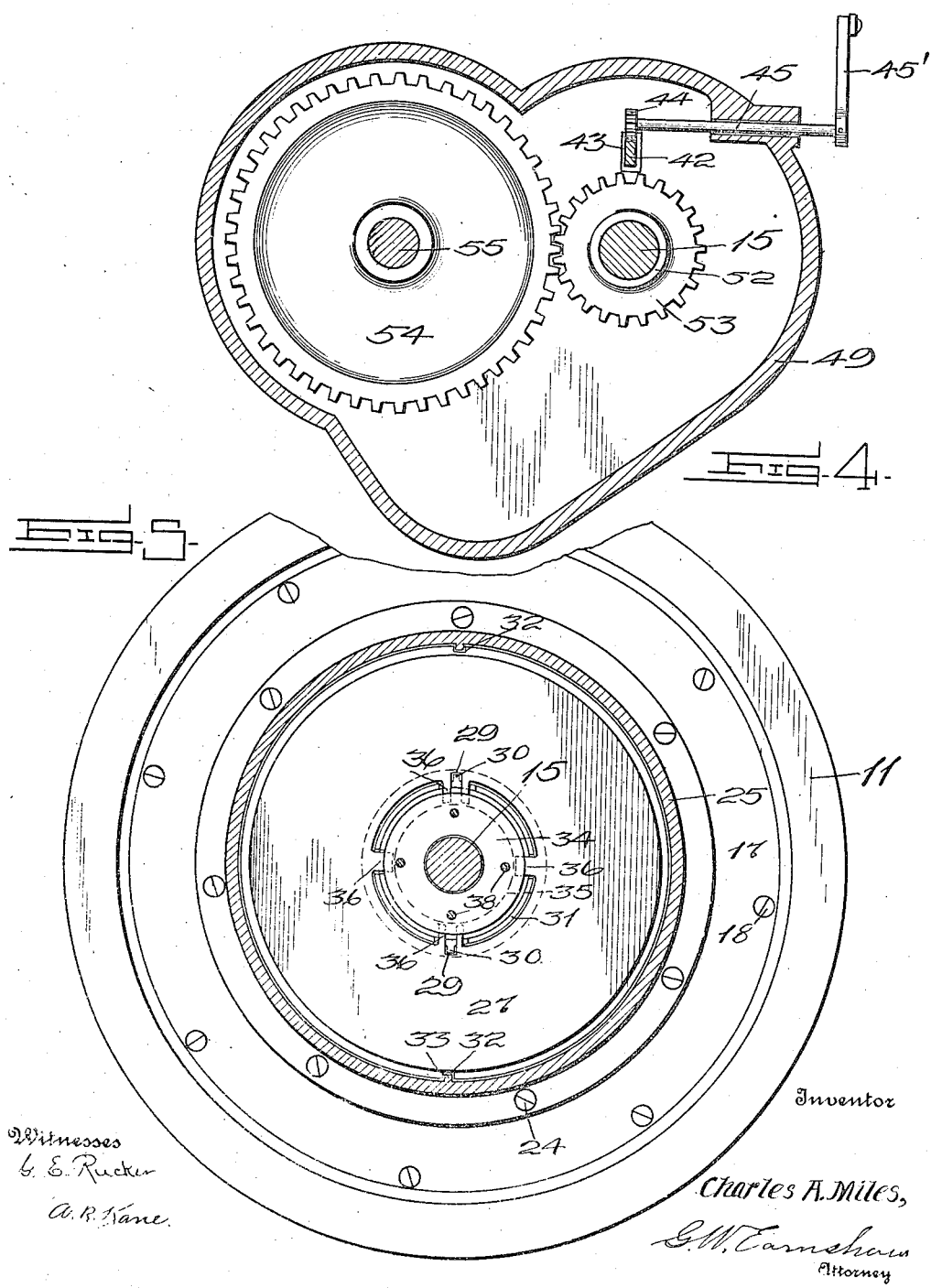

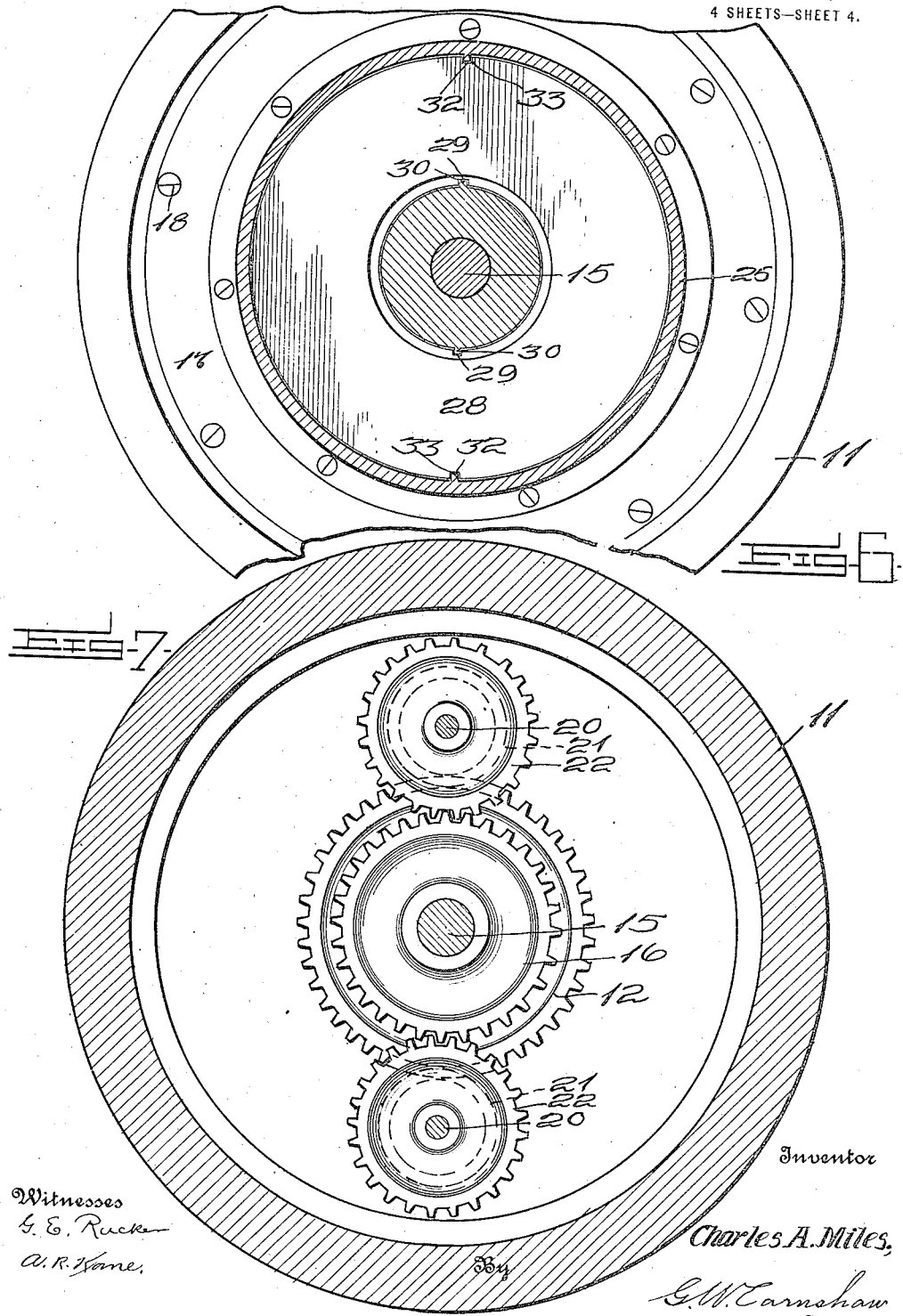

UNITED STATES PATENT OFFICE.

CHARLES A. MILES, OF BAXTER SPRINGS, KANSAS.

TRANSMISSION-GEARING.

1,155,601.

Specification of Letters Patent.

Patented Oct. 5, 1915.

Application filed August 25, 1914. Serial No. 858,420.

*To all whom it may concern:*

Be it known that I, CHARLES A. MILES, a citizen of the United States, residing at Baxter Springs, in the county of Cherokee and State of Kansas, have invented certain new and useful Improvements in Transmission-Gearing, of which the following is a specification.

My invention relates to improvements in planetary transmission gearing.

An important object of the invention is to provide transmission gearing of the above mentioned character which is adapted to prevent racing of the engine when running in low gear, or free, the excessive speed being opposed and run off through the medium of the gears and fly-wheel, such gears operating as planetary gears, thereby preventing overheating of the engine, effecting economy in the wear upon the parts thereof and saving fuel.

A further object of the invention is to provide transmission gearing of the character described, so constructed that the same may be conveniently changed to the different speeds, without subjecting the engine, and parts of the transmission gearing or automobile, to undue strains or jolts.

Other objects and advantages of the invention will be apparent during the course of the following description.

In the accompanying drawings forming a part of this specification and in which like numerals are employed to designate like parts throughout the same, Figure 1 is a central horizontal longitudinal sectional view through transmission gearing embodying my invention, Fig. 2 is a transverse sectional view taken on line 2—2 of Fig. 1, Fig. 3 is a similar view taken on line 3—3 of Fig. 1, Fig. 4 is a similar view taken on line 4—4 of Fig. 1, Fig. 5 is a similar view taken on line 5—5 of Fig. 1, Fig. 6 is a similar view taken on line 6—6 of Fig. 1, and Fig. 7 is a similar view taken on line 7—7 of Fig. 1.

In the drawings, wherein for the purpose of illustration is shown a preferred embodiment of my invention, the numeral 10 designates the crank-shaft of an internal combustion engine, suitably journaled through bearings in the crank case, as is customary. Rotatably mounted upon the crank-shaft 10 is a hollow fly-wheel 11, held against longitudinal movement upon the crank-shaft 10 by a crank-shaft sun-pinion 12 (see Figs. 1 and 7), and a sleeve or ring 13, rigidly mounted upon the crank-shaft, as shown. The rear end of the crank-shaft 10 is provided with an axially extending opening 14, rotatably receiving one end of a jack-shaft 15, as shown. Rigidly mounted upon the forward end of the jack-shaft 15 near and adjacent the crank-shaft sun-pinion 12 is a jack-shaft sun-pinion 16 (see Figs. 1 and 7), of smaller diameter, as shown. The rear side of the hollow fly-wheel 11 is covered by a plate 17 (see Figs. 1 and 6), rigidly attached thereto by means of screws or bolts 18. The plate 17 and the fly-wheel 11 are provided with transversely alined openings 19, rotatably receiving stub-shafts 20 (see Figs. 1 and 7), upon which are rotatably mounted pairs of planet-pinions 21 and 22. In each pair, the planet-pinion 22 has a greater diameter than the planet-pinion 21, the planet-pinion 22 carrying a prolonged tubular hub 23, upon which the planet-pinion 21 is keyed or otherwise rigidly mounted, whereby the two rotate together. The planet-pinions 21, which may be two or more in number, are arranged to permanently engage or mesh with the crank-shaft sun-pinion 12, while the planet-pinions 22 are arranged to permanently engage or mesh with the jack-shaft sun-pinion 16, as shown.

Rigidly attached to the outer side of the plate 17 by means of screws or bolts 24 is a friction disk clutch casing 25, within which is arranged a friction disk clutch, of any well known or preferred type, designated as a whole by the numeral 26. This friction disk clutch comprises alternately arranged sets of disks 27 and 28, (as shown in Figs. 1, 5 and 6). Each disk 27 (see Fig. 5) is provided with a central opening and grooves or notches 29, to receive splines 30, formed upon the tubular frame 31 (see Fig. 1), rigidly mounted upon the jack-shaft 15 for rotation therewith. The disks 27 have no direct connection with the casing 25. The alternate disks 28 (Figs. 1 and 6) are provided with central openings, but are rotatable with respect to the frame 31, the same being provided upon their peripheries with grooves or notches 32, for receiving splines 33, extending longitudinally of the periphery of the casing 25. It is obvious that the most forward friction disk 28 engages with the plate 17, whereby its longitudinal movement is positively prevented. By shifting the most rearward friction disk 27 to the left it is obvious that the two sets of friction disks will have clamping engagement and upon the application of sufficient pressure will be locked, with the result that the fly-wheel 11 will be locked to the jack-shaft 15, for rotation therewith. Any suitable means may be employed to actuate this friction disk clutch, and an example of the same being illustrated in a shifting ring 34, (Figs. 1 and 4), having upon its periphery an annular groove 35, receiving inwardly extending pins 36, rigidly attached to the most rearward disk 27. The shifting ring 34 is of course free to rotate and move longitudinally upon the jack-shaft 15 and is longitudinally shifted by a ring 37 (Fig. 1) these two rings being rigidly connected by bolts or rods 38 mounted to reciprocate through openings 39 formed in the casing 25, the ring 37 being also free to rotate and move longitudinally upon the jack-shaft. The ring 37 is provided upon its periphery with an annular groove 40, rotatably receiving a ring or fork 41, rigidly attached to a horizontal reciprocatory rack-bar 42 mounted to reciprocate within openings 43, as shown. A pinion 44 is arranged above and in engagement with teeth of the rack-bar 42 and is rigidly mounted upon a transverse horizontal rock-shaft 45 (see Fig. 4), provided at its outer end with a vertically swinging crank 45', adapted to be operated by any suitable means. Surrounding the bolts 38 of the friction clutch operating means is a casing or dust guard 46, rigidly secured, by means of bolts 47 or the like, to a vertical head 48, in turn attached to a gear casing 49, by means of bolts 50.

Journaled through an opening 51 in the head 48 is a tubular shaft 52 (see Figs. 1 and 4) rigidly connected and preferably formed integral with the casing 25. The tubular shaft 52 extends into the casing 49 and has a small pinion 53 keyed or otherwise rigidly connected therewith, which engages and drives a large pinion 54, in turn rigidly mounted upon a horizontal counter-shaft 55, journaled within bearings 56 and 57. Rigidly mounted upon the counter-shaft 55 is a reverse pinion 58 and a forward first speed pinion 59, as shown. As more clearly shown in Fig. 2, the reverse pinion 58 engages an intermediate reverse pinion 60, carried by a shaft 61, which is transversely movable in inclined elongated bearings or openings 62, formed in members 63. The shaft 61 is shifted laterally by means of a pivoted forked shifting lever 64, pivoted at 65, any suitable means being employed to swing this lever. The function of this construction will be apparent hereinafter.

At its rear end the jack-shaft 15 carries an enlarged head or wheel 67, (see Figs. 1 and 3), preferably formed integral therewith, having an opening 68, receiving the forward reduced end of a driven shaft 69, which connects with the rear axle of the automobile through the medium of a suitable differential gear, as is customary. The opening 68 contains bearing-rolls 70. Arranged within the casing 49 and splined upon the driven shaft 69 (see Figs. 1 and 2) to move longitudinally thereof and turn with the same, is a shifting pinion 71 adapted to alternately move into and out of engagement with the first forward speed pinion 59, and the intermediate reversing pinion 60, when the pinion 60 is shifted laterally, as it is obvious by reference to Fig. 2. The shifting pinion 71 is provided upon its hub with an annular groove 72, for receiving the forked end of a shifting lever 73, pivoted at 74, the same being adapted to be swung by any suitable means. The shifting pinion 71 is provided upon its forward face with a clutch member 75, adapted for movement into and out of engagement with a co-acting clutch member 76, formed upon the head 67, whereby when the shifting pinion 71 is moved to the left so that these clutch members engage, the pinion is locked to the head 67 for rotation therewith, and thus directly locks the jack-shaft 15 and the driven shaft 69 for rotation together.

Splined upon the head 67 (see Figs. 1 and 3), is a brake-wheel or member 77, having its periphery tapered, and preferably carrying a friction band 78, to engage with a corresponding tapered relatively stationary ring 79, bolted or otherwise rigidly attached to the casing 49 within which the same is disposed. The brake-wheel 77 is provided with a hub 80, having an annular groove 81, receiving a shifting ring 82, which is rotatable therein and rigidly attached to the shifting rack-bar 42. The hub 80 is engaged by a compressible and expansible coil spring 83, surrounding a portion of the jack-shaft 15, and also engaging the rear end of the tubular shaft 52, thus serving to urge the brake-wheel 77 into clamping engagement with the stationary ring 79. Pinion 71 carries forward laterally extending flange member 71', adapted to engage with portion 72' of the brake-wheel 77, to automatically release the same when shifting pinion 71 is locked to head 67. At this point it might be stated that when the brake-wheel 77 is moved by spring 83, into clamping engagement with the ring 79, the same holds the jack-shaft 15 against rotation, whereby the jack-shaft sun-pinion 16 is held against rotation, causing the planet-pinions 21 to rotate upon their axes, for effecting the rotation of the fly-wheel 11 at a speed exceeding crank-shaft speed.

The operation of the transmission gearing is as follows:—When the engine is operating with the automobile at rest, the rotation of the crank-shaft 10 not being imparted to the driven shaft 69, the brake-wheel 77 has clamping engagement with ring 79 and is held stationary while the clutch mechanism 26 is inactive, the shifting pinion 71 occupying the free engine position, as shown in Fig. 1, out of engagement with the pinions 59 and 60. The jack-shaft 15 is now held against rotation by the brake-wheel 77, whereby jack-shaft sun-pinion 16 is also held against rotation. The rotation of the crank-shaft 10 is imparted to the jack-shaft sun-pinion 16 effecting rotation of planet pinions 21 and 22 thereby causing said planet pinions 22 to rotate and travel about the jack-shaft sun-pinion 16, effecting a corresponding rotation of planet-pinions 21, which are thus made to travel about the crank-shaft sun-pinion 12, thereby effecting rotation of fly-wheel 11 in excess of the crank-shaft speed. The rotation of the fly-wheel is transmitted to the pinion 53 by the casing 25 thereby rotating pinion 54, counter-shaft 55, and pinions 58 and 59. In this manner the rotation of the crank-shaft 10 is taken up preventing the engine from running too fast, thus effecting a saving in the fuel used and in the wear upon the engine and associated elements. To operate on forward first speed, crank 45' is swung to turn pinion 44, moving rack-bar 42 forwardly, whereby brake-wheel 77 is released and clutch mechanism 26 simultaneously rendered active to lock the crank-shaft 10 and jack-shaft 15 together. The pinion 53 is now rotating at crank-shaft speed, which rotation is imparted to the pinion 59. Lever 73 is now swung to shift pinion 71 into engagement with pinion 59, whereby the driven shaft 69 is rotated forwardly at first speed. To go into the second forward speed, the shifting pinion 71 remains in engagement with pinion 59, and brake-wheel 77 is returned to clamping engagement with the ring 79 to be held thereby against rotation while the clutch mechanism 26 is simultaneously rendered inactive. This having been done the jack-shaft sun-pinion 16 is held against rotation, whereby the rotation of the crank-shaft 10 is imparted to crank-shaft sun-pinion 12, rotating planet-pinions 21 and 22 upon their axes, the same being made to rotate about the sun-pinion 16, causing the rotation of the fly-wheel 11 at a speed exceeding crank-shaft speed, such increased rotation of the fly-wheel being transmitted to the pinion 59, through the medium of pinions 53, pinion 54, and counter-shaft 55, as above stated. To operate on forward third or high speed, the shifting pinion 71 is moved forwardly, with the gearing operating on second forward speed, the shifting pinion 71 disengaging pinion 59 and moving into engagement with the head 67, whereby the clutch members 75 and 76 lock jack-shaft 15 and driven shaft 69 for rotation, together. Simultaneously with this operation the extension 71' carried by the shifting-gear 71 engage the extension 72' of the brake-wheel 77, moving the same out of engagement with the ring 79 whereby the brake-wheel 77 is free to turn. This produces a partial neutralizing of the different speeds, until the clutch mechanism 26 can be rendered active, which should be accomplished as soon as convenient, by manipulation of the rack-bar 42, as above stated. This having been done, the crank-shaft 10 and jack-shaft 15 are directly engaged for rotation at the same speed, and the driven shaft 69 being directly connected with the jack-shaft 15 for rotation at the same speed, is accordingly rotated at crank-shaft speed. To operate on reverse, the shifting pinion 71 occupies the free engine position as shown in Fig. 1. The brake-wheel 77 is moved forwardly and released and the clutch mechanism 26 rendered active, whereby pinion 53 is rotated at crank-shaft speed, which rotation is reduced and imparted to pinion 58. The intermediate reverse pinion 60 is now shifted laterally into engagement with pinion 71 which occupies the position shown in Fig. 1, effecting a reversed rotation of shaft 69 at a reduced speed. It is obvious that the gearing may be operated at a second speed on reverse, by returning the brake-wheel 77 into engagement with band 79 and rendering clutch mechanism 26 inactive.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In transmission gearing, a driving shaft, a fly-wheel rotatable upon the driving shaft, a second shaft arranged near the driving shaft, a sun-pinion rigidly connected with the driving shaft, a sun-pinion rigidly connected with the second shaft, planetary pinions carried by the fly-wheel and engaging the sun-pinions, clutch mechanism arranged between the fly-wheel and the second shaft and adapted to unlock and lock them, a third shaft connected with the clutch mechanism to be rotated thereby, and means to control the rotation of the second shaft.

2. In transmission gearing, a driving shaft, a second shaft arranged near the same, planetary gearing connecting the shafts, clutch mechanism arranged between the second shaft and the planetary gearing, and means to approximately simultaneously stop the rotation of the second shaft and render the clutch mechanism inactive.

3. In transmission gearing, a driving shaft, a second shaft arranged near the same, planetary gearing connecting the shafts, clutch mechanism arranged between the second shaft and the planetary gearing, a tubular shaft surrounding the second shaft and receiving rotation from the fly-wheel, and means to stop the rotation of the second shaft and render the clutch mechanism inactive.

4. In transmission gearing, a driving shaft, a jack-shaft arranged near the driving shaft, a driven shaft arranged near the jack-shaft, planetary gearing connecting the driving shaft and the jack-shaft, clutch mechanism arranged between the planetary gearing and the jack-shaft, including a casing, a tubular shaft connected with the casing and rotatable upon the jack-shaft, a plurality of gears driven by the tubular shaft, a relatively stationary brake member, a brake-wheel splined upon the jack-shaft to engage and disengage the stationary brake-member, means to operate the clutch mechanism and shift the brake-wheel, and a gear carried by the driven shaft and adapted to be alternately rotated by said plurality of gears or the jack shaft.

5. In transmission gearing, a driving shaft, a jack-shaft arranged near the driving shaft, a driven shaft arranged near the jack-shaft, planetary gearing connecting the driving shaft and the jack-shaft, friction disk clutch mechanism arranged between the planetary gearing and jack-shaft and adapted to lock and unlock the same, a tubular shaft connected with the clutch mechanism and rotatable upon the jack-shaft, a plurality of gears driven by the tubular shaft, a gear splined upon the driven shaft and adapted to be shifted into and out of engagement with certain of the plurality of gears, means to render the clutch mechanism active, and brake means to hold the jack-shaft against rotation when the clutch mechanism is inactive.

6. In transmission gearing, a driving shaft, a jack-shaft arranged near the same, planetary gearing connecting the driving shaft and jack-shaft, clutch mechanism interposed between the planetary gearing and the jack-shaft and serving to lock and unlock the same, a tubular shaft rotatable upon the jack-shaft and connected with the clutch mechanism to be rotated thereby, a stationary brake member, a brake-wheel splined upon the jack-shaft and movable into and out of engagement with the stationary brake member, a common movable device for actuating the clutch mechanism and shifting the brake-wheel, means to move the common movable device and mechanism adapted to be driven either by the jack shaft or the tubular shaft.

7. In transmission gearing, a driving shaft, a jack-shaft arranged near the same, a fly-wheel rotatable upon the driving shaft, a clutch mechanism casing secured to the fly-wheel, planetary gearing arranged within and between the fly-wheel and casing and connecting the driving shaft and jack-shaft and connected with the fly-wheel, a carrier rigidly mounted upon the jack-shaft within the casing, a set of friction disks splined upon the carrier, an alternate set of friction disks arranged within and splined upon the casing, means to operate the sets of friction disks to render the clutch mechanism active and inactive, brake mechanism to control the rotation of the jack-shaft, and a member connected with and rotated by the casing.

8. In transmission gearing, a jack-shaft, a driven shaft arranged near and in end to end relation to the jack-shaft, a stationary brake member arranged near the jack-shaft, a brake wheel splined upon the jack-shaft to engage and disengage the brake member, a clutch member carried by the end of the jack-shaft, a co-acting clutch member splined upon the driven shaft and adapted when moved into locked engagement with the first named clutch member to shift the brake-wheel to release the same, and means to shift the co-acting clutch member.

9. In transmission gearing, a jack-shaft, a driven shaft arranged near and in end to end relation to the jack-shaft, a counter-shaft arranged near and upon one side of the jack-shaft and driven shaft, driving connecting means between driven-shaft and the counter-shaft, a plurality of gears carried and rotated by the counter-shaft, a clutch member carried by the end of the jack-shaft, a shifting gear splined upon the driven shaft for engagement with certain of the plurality of gears and having a clutch member to co-act with the first named clutch member, means to move the shifting gear longitudinally of the driven shaft, a stationary brake member, a brake wheel splined upon the jack shaft and movable into and out of engagement with the brake member, and means whereby the brake wheel is automatically moved out of engagement with the stationary brake member upon the clutch members being moved into locked engagement.

10. In transmission gearing, a driving shaft, a jack-shaft arranged near the driving shaft, a driven shaft arranged near the jack-shaft, planetary gearing connecting the driving shaft and the jack-shaft, clutch mechanism arranged between the jack-shaft and planetary gearing and adapted to unlock and lock the same for rotation together, a power transmitting shaft connected with the clutch mechanism to be rotated thereby, a counter-shaft arranged near the jack-shaft and driven shaft, driving connecting means between the power transmitting shaft and the counter-shaft, a gear carried by the counter-shaft, a gear splined upon the driven shaft for engagement and disengagement with the first named gear, means to lock the jack-shaft and driven shaft for rotation together upon the shifting movement of the second named gear in one direction, brake means to control the rotation of the jack-shaft, means whereby the brake means is rendered inactive upon the shifting movement of the second gear in one direction, and means to render the clutch mechanism active.

11. In transmission gearing, a rotatable shaft, a driven shaft arranged near the rotatable shaft, a tubular shaft mounted upon the rotatable shaft for rotation with relation thereto, a counter-shaft arranged near and upon one side of the shafts, driving connecting means between the tubular shaft and the counter-shaft, a first speed gear carried by the counter-shaft, a reverse gear carried by the counter-shaft, a laterally movable intermediate reverse gear engaging the said reverse gear, means to laterally shift the laterally movable intermediate reverse gear, a shifting gear splined upon the driven shaft to be moved to operative positions with respect to the first speed gear and the second named reverse gear, and clutch means to lock and unlock the rotatable shaft and the driven shaft.

12. In transmission gearing, a rotatable shaft, a driven shaft arranged near the rotatable shaft, a tubular shaft mounted upon the rotatable shaft for rotation with relation thereto, a counter-shaft arranged near and upon one side of the shafts, driving connecting means between the tubular shaft and the counter-shaft, a first speed gear carried by the counter-shaft, a reverse speed gear carried by the counter-shaft, an intermediate reverse gear engaging the first named reverse gear, a shifting gear splined upon the driven shaft to be moved into operative positions with respect to the first speed gear and the intermediate reverse gear, clutch means to unlock and lock the rotatable shaft and the driven shaft, brake mechanism for controlling the rotation of the rotatable shaft, and means for rotating the tubular shaft at different speeds when the clutch mechanism is active and inactive.

In testimony whereof I affix my signature in presence of two witnesses.

CHARLES A. MILES.

Witnesses:
W. W. WYATT,
J. J. QUIGG.